(12) United States Patent
Yang et al.

(10) Patent No.: US 11,366,655 B2
(45) Date of Patent: Jun. 21, 2022

(54) POWER TOOL SYSTEM AND UPGRADING METHOD FOR THE SAME

(71) Applicant: Nanjing Chervon Industry Co., Ltd., Nanjing (CN)

(72) Inventors: Dezhong Yang, Nanjing (CN); Zhao Hu, Nanjing (CN); Dongyue Wang, Nanjing (CN); Yang Wang, Nanjing (CN); Yunfeng Hu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 85 days.

(21) Appl. No.: 16/844,563

(22) Filed: Apr. 9, 2020

(65) Prior Publication Data

US 2020/0233658 A1 Jul. 23, 2020

Related U.S. Application Data

(63) Continuation of application No. PCT/CN2018/118591, filed on Nov. 30, 2018.

(30) Foreign Application Priority Data

Nov. 30, 2017 (CN) .......................... 201711237737.5
Nov. 30, 2017 (CN) .......................... 201711240293.0
Dec. 21, 2017 (CN) .......................... 201711392631.2

(51) Int. Cl.
*G06F 8/654* (2018.01)
*A01D 34/00* (2006.01)
(Continued)

(52) U.S. Cl.
CPC ........... *G06F 8/654* (2018.02); *A01D 34/006* (2013.01); *A01D 34/008* (2013.01);
(Continued)

(58) Field of Classification Search
None
See application file for complete search history.

(56) References Cited

U.S. PATENT DOCUMENTS 7,366,589 B2 * 4/2008 Habermas ............. B60L 3/0023
701/1
9,301,337 B2 3/2016 Brown et al.
(Continued)

FOREIGN PATENT DOCUMENTS

CN 101068196 A 11/2007
CN 103066703 A 4/2013
(Continued)

OTHER PUBLICATIONS

United States Patent and Trademark Office, Final Office Action issued in U.S. Appl. No. 16/887,664, dated Mar. 2, 2021, 12 pgs.
(Continued)

*Primary Examiner* — Marina Lee
(74) *Attorney, Agent, or Firm* — Greenberg Traurig, LLP

(57) ABSTRACT

A power tool system includes a power tool and a cloud sever configured to receive an upgrading file for upgrading the power tool. The power tool is adapted for wireless communication with the cloud server and includes a motor, a driving module for driving the motor, a control module for outputting a control signal to the driving module, and an IoT module for establishing a wireless communication link between the power tool and the cloud server. The IoT module, the driving module and control module share a bus, and the upgrading file is simultaneously distributed to the control module and/or the driving module through the bus.

10 Claims, 14 Drawing Sheets

(51) Int. Cl.
*H04L 67/125* (2022.01)
*H04W 4/70* (2018.01)
*H04L 9/40* (2022.01)
*H04L 67/00* (2022.01)
*G06K 17/00* (2006.01)
*G06F 9/4401* (2018.01)
*H04W 12/06* (2021.01)

(52) U.S. Cl.
CPC ...... *G06K 17/0029* (2013.01); *H04L 63/0428* (2013.01); *H04L 63/123* (2013.01); *H04L 67/125* (2013.01); *H04L 67/34* (2013.01); *H04W 4/70* (2018.02); *G06F 9/4401* (2013.01); *H04W 12/06* (2013.01)

(56) References Cited

U.S. PATENT DOCUMENTS

| | | | |
|---|---|---|---|
| 11,029,941 B2* | 6/2021 | Yang | H01M 10/4257 |
| 2015/0006025 A1 | 1/2015 | Husqvarna | |
| 2015/0007155 A1* | 1/2015 | Hoffman | G06F 8/65 717/168 |
| 2015/0185289 A1 | 7/2015 | Yang et al. | |
| 2018/0095769 A1* | 4/2018 | Peng | G06F 9/4401 |
| 2018/0126537 A1 | 5/2018 | Tanaka et al. | |
| 2020/0227931 A1 | 7/2020 | Yamaguchi et al. | |
| 2020/0233658 A1 | 7/2020 | Yang et al. | |

FOREIGN PATENT DOCUMENTS

| | | |
|---|---|---|
| CN | 103703652 A | 4/2014 |
| CN | 103970553 A | 8/2014 |
| CN | 204649241 U | 9/2015 |
| CN | 105474868 A | 4/2016 |
| CN | 105759820 A | 7/2016 |
| CN | 105766196 A | 7/2016 |
| CN | 106056875 A | 10/2016 |
| CN | 106161489 A | 11/2016 |
| CN | 107888751 A | 4/2018 |
| WO | 2019105466 A1 | 6/2019 |

OTHER PUBLICATIONS

United States Patent and Trademark Office, Non-Final Office Action issued in U.S. Appl. No. 16/887,664, dated Nov. 12, 2020, 7 pgs.
United States Patent and Trademark Office, Final Office Action issued in U.S. Appl. No. 16/887,584, dated Dec. 14, 2020, 7 pgs.
ISA/CN, International Search Report issued on application No. PCT/CN2018/118591, dated Mar. 1, 2019, 3 pages.
United States Patent and Trademark Office, Office Action issued in U.S. Appl. No. 16/887,584, dated Sep. 3, 2020, 8 pgs.

* cited by examiner

POWER TOOL SYSTEM AND UPGRADING METHOD FOR THE SAME

RELATED APPLICATION INFORMATION

The present application claims the benefit of and is a continuation of International Application Number PCT/CN2018/118591, filed on Nov. 30, 2018, which application claims the benefit of Chinese Patent Application No. 201711240293.0, filed on Nov. 30, 2017, Chinese Patent application number 201711237737.5, filed on Nov. 30, 2017, and Chinese Patent application number 201711392631.2, filed on Dec. 21, 2017 in the SIPO (State Intellectual Property Office—Chinese Patent Office). Each of these is incorporated herein by reference in its entirety.

TECHNICAL FIELD

The present disclosure relates to a power tool system, in particular, a power tool system having a wireless transmission function.

BACKGROUND

With the development of the network technology and the intelligent and popularization of the mobile communication equipment, data connections and sharing between things through communication protocols are gradually changing people's life.

In the field of power tools, if data transmission may be established between the power tool and mobile terminal and between the power tools, it is of great significance in many aspects, such as improving the use efficiency of the power tool, providing the user with personalized control program, etc.

SUMMARY

The present disclosure adopts the following technical solution.

In one example, disclosed is a power tool system, including a cloud server configured to be written with an upgrading file for upgrading the power tool system, and a power tool in wireless communication with the cloud server. The power tool includes a motor, a driving module for driving the motor, a control module for outputting a control signal to the driving module, and an internet of things (IoT) module for establishing a wireless communication link between the power tool and the cloud server. The IoT module, the driving module and control module share a bus, and the upgrading file is simultaneously allocated to at least one of the control module or the driving module through the bus.

In a further example, disclosed is an upgrading method for a power tool system. The power tool system includes a cloud server and a power tool in wireless communication with the cloud serve, the power tool includes a driving module for driving a motor, a control module for outputting a control signal to the driving module and an IoT module for establishing a wireless communication link with the cloud server. The upgrading method includes: writing an upgrading file into the cloud server, and simultaneously transmitting the upgrading file to at least one of the control module or the driving module through a bus.

DETAILED DESCRIPTION

The present disclosure is described in detail hereinafter through specific examples in conjunction with the accompanying drawings.

Figure 1:
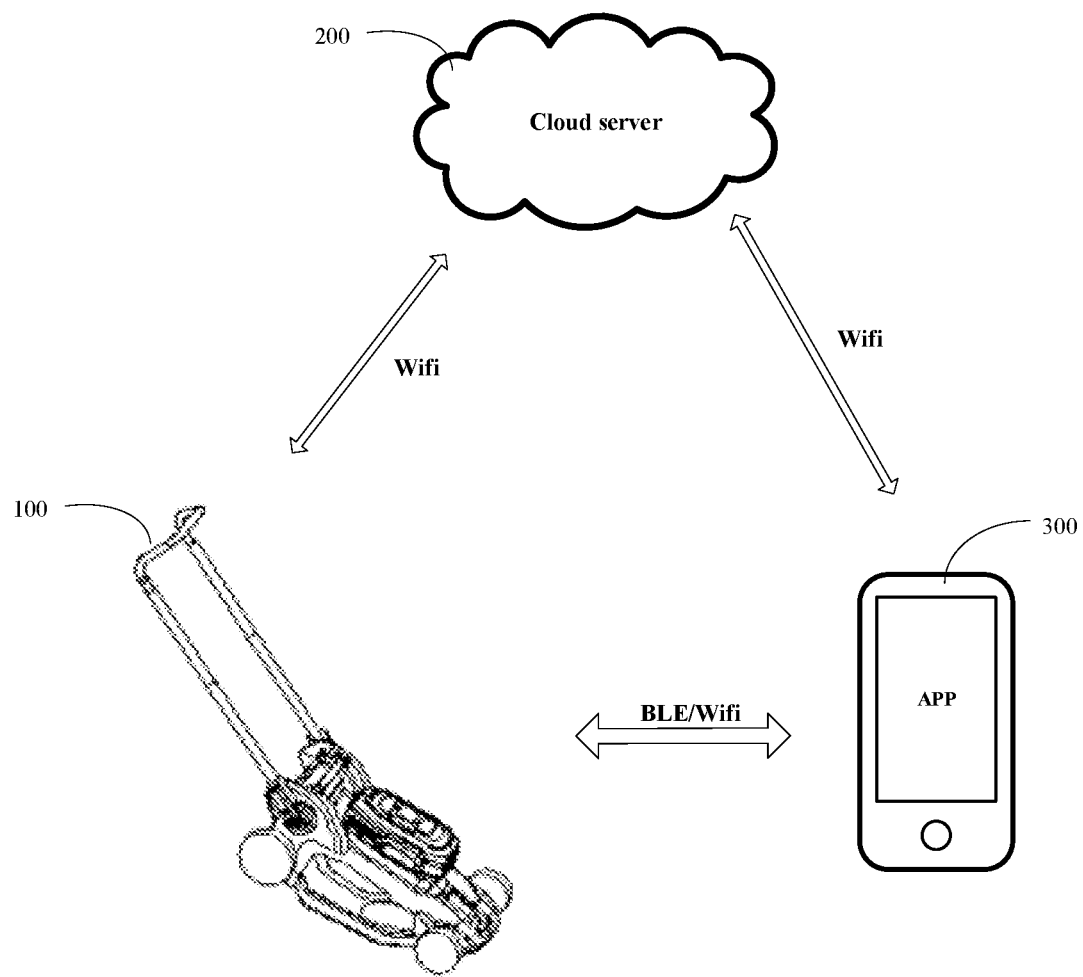
FIG. 1 is a structural schematic diagram illustrating a power tool system according to an example.
Figure 2:
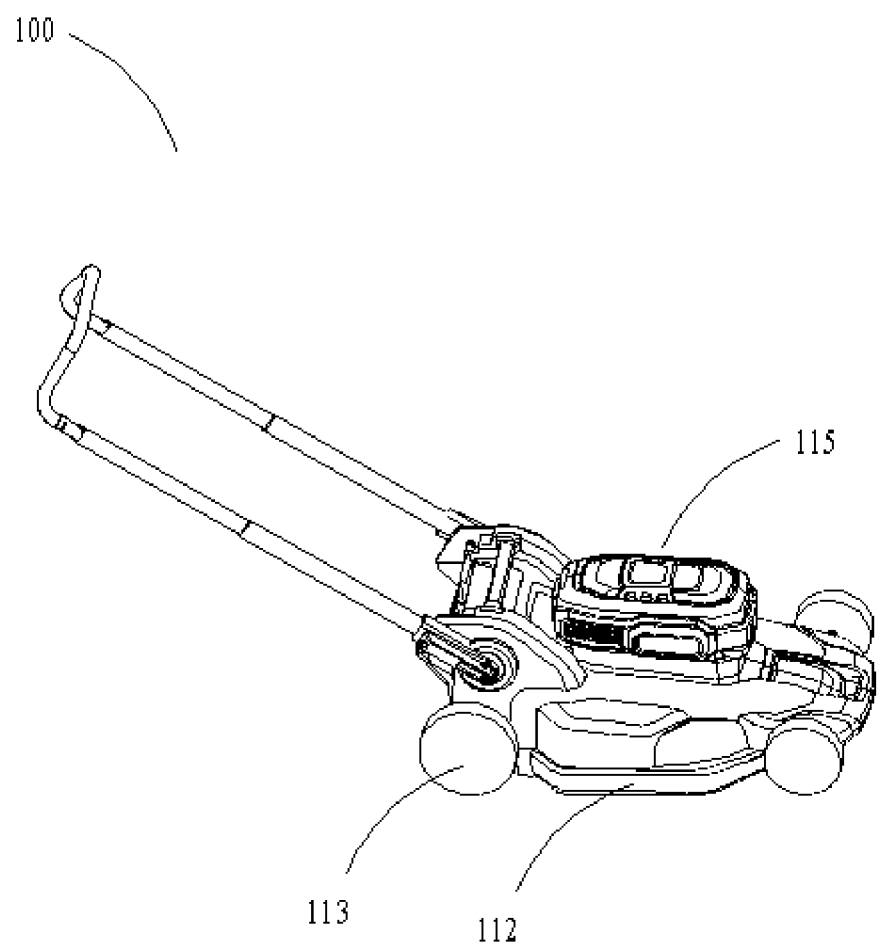
FIG. 2 is a structural diagram illustrating a lawn mower in FIG. 1.

With reference to FIG. 1 and FIG. 2, the power tool system includes a cloud server 200, a power tool and a terminal 300.

The cloud server 200 is configured for at least storing an upgrading file, and the cloud server 200 further has server functions, such as sending and receiving files, receiving and transmitting instructions, computing, data processing and analysis, and network transmission. The cloud server 200 is in communication with an external device in a wireless manner, and the cloud server 200 is in wireless communication with the external device through WiFi, ZigBee, NB-IOT and the like. In some examples, the cloud server 200 is in wireless communication with the external device through WiFi, and the developer or service provider writes the new upgrading file into the cloud server 200 for storage.

With reference to FIG. 1, as one example of a power tool, a lawn mower 100 is used as an example for description. The power tool may also be a snowplow, a pruner, a table saw and the like, which is not limited herein.

The lawn mower 100 includes a blade, a motor, a base plate 112, a wheel group 113 and a case assembly. The blade is configured for trimming grass, and the motor is configured for driving the blade to rotate. The base plate 112 is used, as a main part of the lawn mower, for assembling the parts together. The wheel group 113 is configured for supporting the base plate 112 and is rotatable relative to the base plate 112, so that the lawn mower is movable relative to the ground. The base plate 112 is formed with a cutting chamber, and the blade is rotated in the cutting chamber under driving of the motor. At least part of the case assembly covers the base plate 112.

The lawn mower further includes a battery pack 115, and the batter pack is used, as a power source for the lawn mower, to supply power to the lawn mower. In some examples, the battery pack is detachably connected to the lawn mower.

In some examples, the lawn mower is a hand-driven lawn mower, including a handle operation device, and the movement of the lawn mower is realized by the user operating the handle. In other examples, the lawn mower includes two motors. One of the two motors is configured for driving the blade to rotate to realize the cutting function, and another of the two motors is configured for driving the wheel group 113 to achieve self-propelled movement of the lawn mower.

With reference to FIG. 2, the lawn mower 100 further includes a power supply module 120, an information collection module 130, a lawn mowing module 140, a self-propelled module 150, and an internet of things (IoT) module 160.

The power supply module 120 is configured for converting the power provided by the power battery into power suitable for respective modules of the lawn mower so as to supply power to respective modules of lawn mower. The power supply module 120 includes a lawn mower interface 121, a power supply conversion circuit 122 and a power supply bus interface 123. The lawn mower interface 121 is configured for accessing the battery pack, and is electrically connected to a battery pack interface. The power supply conversion circuit 122 is configured for converting the power of the accessed battery pack into power with different voltages suitable for respective modules so as to supply power to respective modules, and is electrically connected to the lawn mower interface 121.

The information collection module 130 is configured for collecting data information related to the lawn mower, such as current of cutting motor for cutting grass, voltage of cutting motor, rotation speed of cutting motor, current of driving motor for driving wheel, voltage of driving motor, and rotation speed of driving motor. In one example, the information collection module 130 includes an information collection unit 131, an information processing unit 132, and an information storage unit 133. In some examples, the information collection unit 131 includes a current sensor for collecting the current of cutting motor, a voltage sensor for collecting the voltage of cutting motor, and other circuits or devices for collecting the voltage or current. The information processing unit 132 is electrically connected to the information collecting unit 131, and is configured for performing computing, processing or the like on the data collected by the information collection unit 131.

The information storage unit 133 is configured for storing data related to the lawn mower, including but not limited to a model number of the lawn mower, historical data of the lawn mower, current and voltage data collected by the information collection unit 131.

In some examples, the information storage unit 133 is configured to store data information related to the lawn mower according to a preset data structure.

Figure 11:
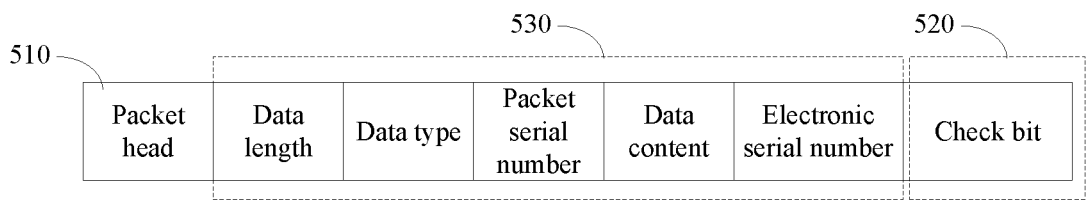
FIG. 11 is a data structural diagram according to an example.

With reference to FIG. 11, the preset data structure includes a packet head for information transmission, a packet tail for security verification, and a data packet body. The data packet body includes data length, data type, packet serial number, data content and electronic serial number. In one example, the data type includes real-time data, statistical data or historical data related to the lawn mower. Namely, the same type of data is put into a data structure group, which saves the waste of data space caused by repetition of the packet head, the packet tail and the like, thereby saving the data storage space.

The grass cutting module 140 includes a cutting driving unit 141, a cutting storage unit 142, a cutting bus interface 142 and a cutting control unit 144. The cutting motor driving unit 141 is connected to a cutting motor and is configured for driving the cutting motor to rotate to drive the blade to cut. The cutting control unit 144 is configured for outputting a control signal to the cutting motor driving unit 141, such that the cutting motor driving unit 141 drives the cutting motor at a preset frequency.

The cutting storage unit 142 is coupled to the cutting control unit 143, and configured for storing data related to the cutting function of the lawn mower, such as historical data, statistical data, and related applications of the lawn mower and the like.

In some examples, the cutting storage unit 142 is configured for storing data related to the cutting function of the lawn mower. The cutting storage unit 142 is configured to store the data related to lawn mower according to the data structure shown in FIG. 11, which is not described herein.

The self-propelled module 150 includes a driving motor driving unit 151, a self-propelled storage unit 152, a self-propelled bus interface 153 and a self-propelled control unit 154. The self-propelled motor driving unit 151 is connected to the self-propelled motor, and is configured for driving the driving motor to rotate to drive the wheel group 113 to rotate so as to realize the self-propelled movement of the lawn mower. The self-propelled control unit 154 is configured for outputting a self-propelled signal to the self-propelled motor driving unit 151, such that the self-driving motor driving unit 151 drives the self-propelled motor to rotate to realize the self-propelled movement of the lawn mower.

The self-propelled storage unit 152 is configured for storing data related to the self-propelled movement of the lawn mower, such as position coordinates of lawn mower, a built-in lawn mowing map, the rotation speed of self-propelled motor. The self-propelled storage unit 152 is configured to store the data related to the self-propelled movement of the lawn mower according to the data structure shown in FIG. 11, which is not described herein.

The IoT module 160 includes a wireless communication unit 161, a file storage unit 162, an IoT bus interface 163, an IoT verification unit 164, a distribution network unit 165, and an IoT processing unit 166. The wireless communication unit 161 is in communication with the cloud server and the terminal in a wireless manner. In one example, the wireless communication unit 161 receives instructions from the terminal and/or a file transmitted by the cloud server. The instructions from the terminal includes, but are not limited to, upgrading confirmation instruction from the terminal, acquiring battery pack power information, such as remaining power of battery pack, remaining usage time of battery pack, and self-propelled trajectory of lawn mower. The file transmitted by the cloud server includes, but is not limited to, applications and an upgrading file for upgrading the respective modules in the lawn mower, data packet and an upgrading file for upgrading the better pack.

In some examples, the wireless communication unit 161 includes a Bluetooth 166 and WiFi 167. The lawn mower and the cloud server are wirelessly connected through the WiFi, and the lawn mower and the terminal are wirelessly connected through the Bluetooth. The communication between the terminal and the lawn mower is established through the Bluetooth when the WiFi signal is poor, thereby improving the user experience and reducing the power loss of the lawn mower.

The IoT bus interface 163 is configured for establishing communication connections with the modules in the lawn mower so as to realize the transmission of the data, files and instructions. In one example, the IoT bus interface 163 establishes communication connections with the modules in the lawn mower in a bus manner.

Figure 3:
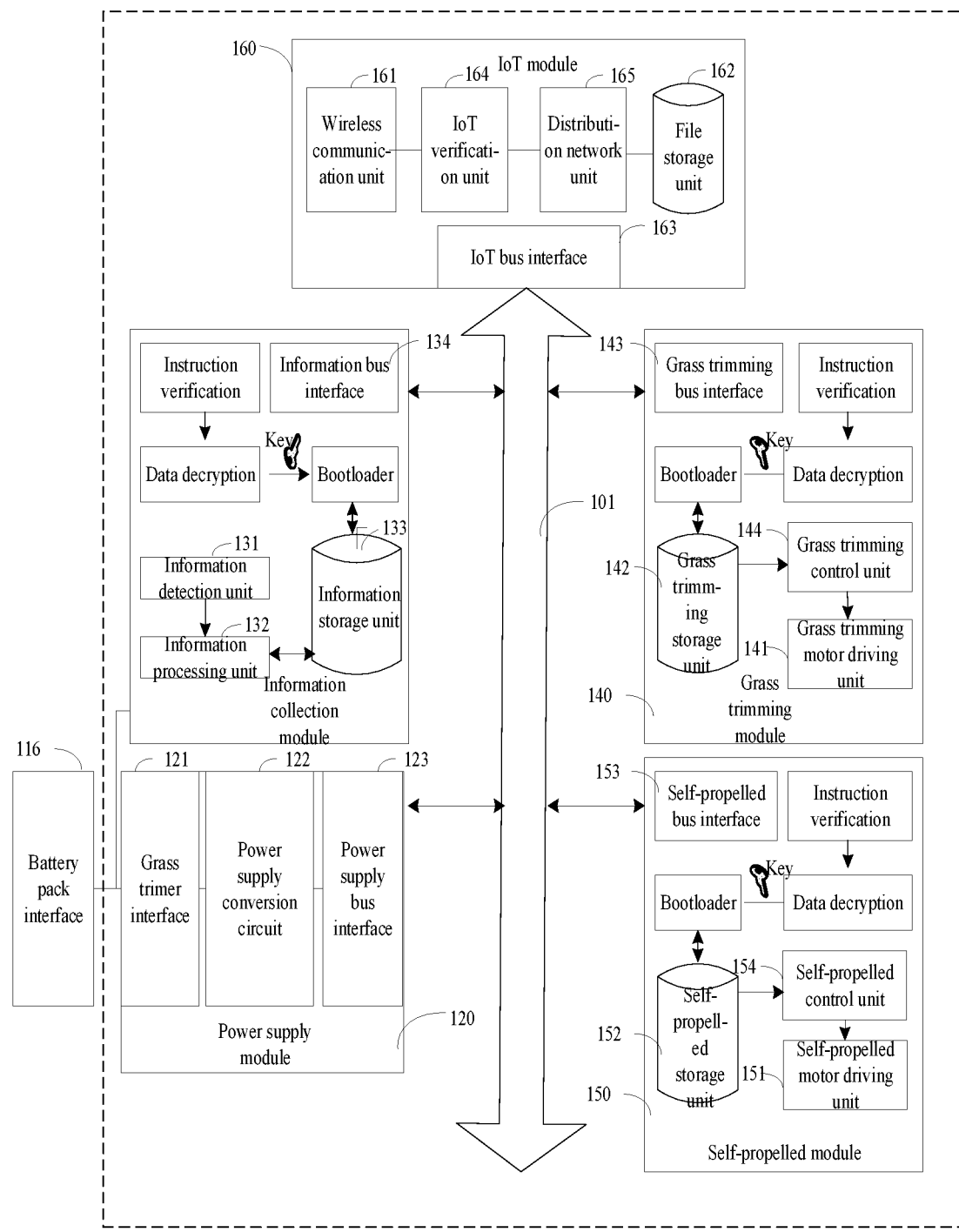
FIG. 3 is an interior structural flowchart illustrating the lawn mower in FIG. 1.
Figure 4:
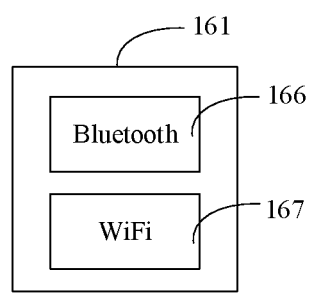
FIG. 4 is a structural diagram illustrating a wireless communication unit in FIG. 3.

With reference to FIG. 3, the IoT bus interface 163, the power supply bus interface 123, the lawn mowing bus interface 143 and the self-propelled bus interface 153 each are mounted on a bus 101, so as to realize information exchange and data transmission between the modules through the bus 101.

Information scheduling between the IoT module 160 and the modules is established through the bus, the modules simultaneously share the upgrading file transmitted by the IoT module 160 through the bus, and the IoT module 160 may simultaneously receive bus distribution requests sent by the modules, which effectively enables the modules to send data in time, avoids delay, and improves transmission efficiency of the whole system and effect of real-time data transmission.

In some examples, the wireless communication unit 161 receives the upgrading instruction from the terminal and transmits the received upgrading instruction to the lawn mowing module 140 to upgrade the lawn mowing module 140. In some examples, the wireless communication unit 161 receives the upgrading instruction from the terminal and transmits the received upgrading instruction to the self-propelled module 150 to upgrade to the self-propelled module 150. In other examples, the wireless communication unit 161 receives the upgrading instruction from the terminal and transmits the received upgrading instruction to one or more of the lawn mowing module 140 or the information collection module 130. The upgrading instruction includes a preset node upgrading order, and one of the individual functional modules of the lawn mower is treated as a node. All the modules that require information interaction with the outside may be understood as nodes. The upgrading instruction includes the preset node upgrading order, so that the nodes are upgraded according to the preset upgrading order.

In some examples, the file storage unit 162 is configured for storing the upgrading file transmitted by the cloud server. After the upgrading instruction for the upgrade confirmation is received, the upgrading file is transmitted to the corresponding modules in the lawn mower to upgrade the corresponding modules according to the upgrading file. In some examples, after the IoT module 160 receives the upgrading instruction for the upgrade confirmation, the file storage unit 162 firstly stores the upgrading file transmitted by the cloud server; and then, after the upgrading file is downloaded, the upgrading file is sent to the corresponding module in the lawn mower. In one example, the IoT module 160 includes the IoT processing unit, and the IoT processing unit is configured for receiving the upgrading instruction from the terminal or transmitting the upgrading instruction to the lawn mowing module 140 and/or the self-propelled module 150. Since the lawn mower and the cloud server are in communication in a wireless manner such as WiFi, the manner that the upgrading file is firstly downloaded and stored to the file storage unit 162 and then the upgrading file in the file storage unit 162 is called to upgrade the corresponding modules is adopted, which avoids the situation of upgrading failure of the lawn mower caused by the unstable network. Further, after the upgrading file is downloaded, namely, after the complete upgrading packages of the upgrading file is stored in the file storage module, the corresponding module of the lawn mower may be updated and upgraded after the lawn mower is disconnected from the network.

The IoT verification unit 164 is configured for perform identity verification on the received data, for example, whether or not the data baud rate is matching and whether or not the upgrading data packet is complete.

The distribution network unit 165 is configured for establishing network connection between the lawn mower and cloud server and between the lawn mower and the terminal. In some examples, the wireless communication unit 161 includes the Bluetooth and the WiFi, and the network distribution unit 165 is configured for selectively connecting the lawn mower 210 with the terminal in a wireless manner, namely through the Bluetooth or the WiFi. In one example, when the distribution network unit 165 detects that the Bluetooth and the WiFi are available at the same time, the Bluetooth is preferred, that is, the lawn mower and the terminal are connected through the Bluetooth, which has the following advantages, reducing the power consumption of the lawn mower and the terminal, a relatively fast response speed, and improving the user experience.

In one example, the distribution network unit 165 is configured to detect whether or not both the Bluetooth and the WiFi are in an active state. When the Bluetooth and the WiFi are in the active state, the Bluetooth is activated. After the Bluetooth is activated, an access authentication request is sent to the terminal to perform the identity verification on the terminal; after the terminal receives the access authentication request from the Bluetooth unit, the access authentication request is responded by a preset authentication method; the Bluetooth receives the access authentication response from the terminal, and perform the authentication matching on the terminal; if the matching is successful, the Bluetooth unit opens the access right for the terminal to establish Bluetooth connection between the lawn mower and the terminal, so as to realize the data transmission and communication.

When the software of the lawn mower has problems or the shipped product needs to be updated on the program or upgraded on the software, the machine needs to be disassembled to realize the change of the software of the product, which brings a lot of inconvenience to the product development and user use. Therefore, a more convenient and quick software upgrading method needs to be designed for the lawn mower.

Figure 5:
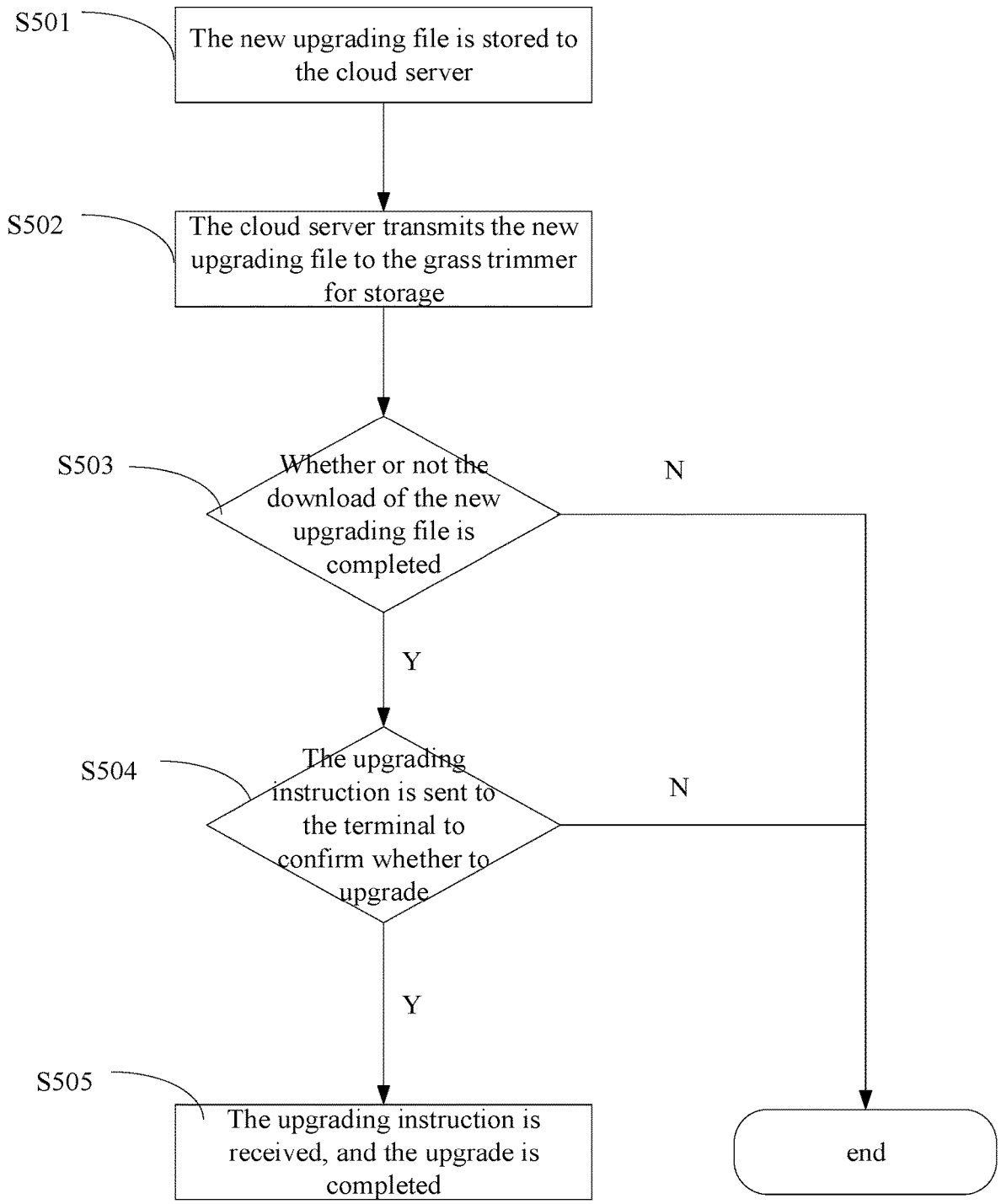
FIG. 5 is a flow diagram illustrating a software upgrading method for the lawn mower system according to an example.

With reference to FIG. 5, the software upgrading method for the lawn mower system mainly includes the following steps:

S501: a new upgrading file is stored to the cloud server.

In one example, the developer writes the new upgrading file to the cloud server for storage. In some examples, the upgrading file is an upgrading file for upgrading one of the lawn mowing module 140, the information collection module 130 and the self-propelled module 150. In some examples, the upgrading file is an upgrading file for upgrading any combination of, or all of the lawn mowing module 140, the information collection module 130 and the self-propelled module 150. In some examples, the upgrading file is an upgrading file for upgrading the battery pack. In some examples, the upgrading file includes an upgrading data packet for upgrading the modules in the lawn mower or an upgrading data packet for upgrading the battery pack.

The upgrading file includes upgrading target information (such as one or more of the type, the model, and the code of the product), file version information and file verification information.

S502: the cloud server transmits the new upgrading file to the lawn mower for storage.

In this step, after the lawn mower is wirelessly connected to the cloud server, the new upgrading file transmits to the lawn mower in a wireless transmission manner, such as WiFi, NB-IOT, LoRa.

The new file upgrading file is stored to the lawn mower. In one example, the new upgrading file is stored to the IoT module 160. In one example, the IoT module 160 is provided with a flash memory for storing the new upgrading file, and the new upgrading file is stored to the flash memory. The flash memory includes a boot loader area for storing a boot loader and an application area (shown in FIG. 6) for storing the application.

S503: whether or not the download of the new upgrading file is completed is determined, and if yes, execute S504; otherwise, end.

S504: an upgrading instruction is sent to the terminal 300 to determine whether or not the upgrade is need, if yes, execute S505; otherwise, end.

In this step, after the download of the new upgrading file is completed, the lawn mower sends the upgrading instruction to the terminal 300. In one example, the upgrading instruction is sent to the terminal in a wireless transmission manner through the IoT module 160. In one example, the IoT module 160 includes the WiFi unit and the Bluetooth unit, and the data transmission between the lawn mower and the terminal through the Bluetooth, namely, the lawn mower sends the upgrading instruction to the terminal 300 through the Bluetooth, so as to reduce the power consumption of the lawn mower.

The terminal is a mobile device such as a mobile computer and a mobile phone, including a display device for the user operation. After the terminal receives the upgrading instruction transmitted by the lawn mower, the upgrading instruction is displayed, in a graphic form, on the display device for the user to choose whether or not the upgrade is needed. If the user confirms the upgrade, go to S505; otherwise, end.

S505: the upgrade confirmation instruction is received, and the upgrade is completed.

In this step, the lawn mower receives the upgrade confirmation instruction from the terminal in a wireless manner. The IoT module 160 responds to the upgrade confirmation instruction, calls the new upgrading file stored in the file storage unit 162, and transmits the new upgrading file to the corresponding module to be upgraded, so as to complete the upgrade.

In the above upgrading method, the new upgrading file is firstly stored in the IoT module 160 and then the upgrade is performed, so that the upgrade is completed, even though the network signal is unstable, as long as the upgrading file has been stored to the IoT module 160. Comparing to the upgrading method that the upgrade is performing while the download is performing, the upgrading efficiency is improved while the data information redundancy is avoided, and the storage space of the IoT module 160 is released.

Another software upgrading method for the lawn mower system mainly includes the following steps:

S511: a new upgrading file is stored to the cloud server.

S512: an upgrading instruction is sent to the terminal 300 to confirm whether or not the upgrade is needed, if yes, go to S513; otherwise, end.

S513: the cloud server transmits the new upgrading file to the lawn mower for storage.

S514: whether or not the download of the upgrading file is completed is determined, if yes, execute S515; otherwise, end.

S515: the upgrading file is updated, and the upgrade is completed.

Different from the above software upgrading method, the terminal firstly confirms whether or not the upgrade is needed, if yes, the cloud server then transmits the new upgrading file to the lawn mower for storage.

Hereinafter how the program is updated or upgraded in the lawn mower is described in detail. The program is updated or upgraded in the lawn mower in a boot loader manner.

The boot loader is an operation of the controller on part of the flash memory thereof to realize the update of the application, so as to realize the update or the upgrade of the software. In this way, the communication with the modules in the lawn mower may be established through a predetermined communication interface, so that the modules call the boot loader to update the application, so as to realize the update and the upgrade of firmware of the lawn mower. The modules herein include the IoT module 160, the collection module, and the pro-propelled module 150 and the like. In some examples, the modules include a programmable MCU and a flash memory, and the boot loader is stored in the flash memory.

Figure 6:
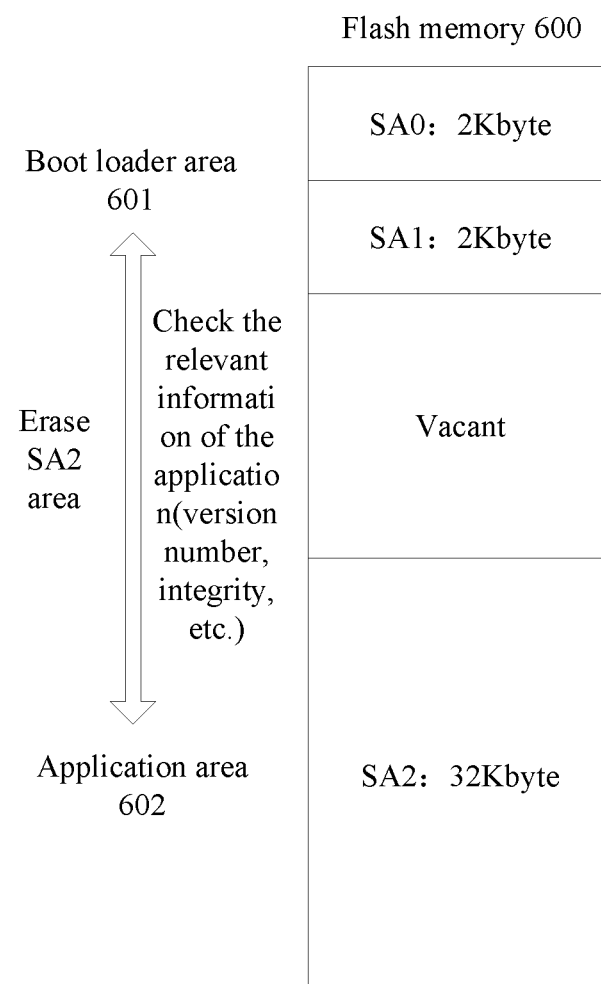
FIG. 6 is an interior structural diagram illustrating a boot loader according to an example.

With reference to FIG. 6, a structural schematic diagram of the boot loader is shown. The boot loader includes a boot loader area 601 and an application area 602. The boot loader area receives the external data and instruction in a communication manner, verifies related information of the application area (such as whether or not the file is complete and version information), and updates the application stored in the application area. The application area is configured for storing applications, namely, application code. The flash memory allocates storage space to the boot loader area and the application area respectively according to the actual situation. As shown in FIG. 6, the flash memory allocates two storage areas SA0 and SA1 to the boot loader area and allocates a storage area SA2 to the application area. The flash memory is further stored with other information related to the lawn mower system 10 to a storage area SA3.

The boot loader has a read-write function, and the boot loader may read data information stored in the flash memory, write the data information to the storage, overwrite all applications stored in the flash memory, and write a new program. The boot loader 601 executes reading, writing and/or erasing by calling commands of some predetermined functions. For example, calling a read comment "R" may read the data information in the flash memory 600, calling an erasing comment "E" may erase any or all of memory segments, and calling a write command "W" may write the data into any or all of the memory segments.

An executable program of the boot loader 601 stored in the flash memory 600 of MCU may read the data in the flash memory 600 or write the data into the flash memory. When the application stored in the flash memory 600 needs to be updated, the new application may be written into the application area 602 through the boot loader 601, to replace the original application with a new application.

Since both the boot loader 601 and the application are stored in the flash memory 600 of MCU, the MCU may incorrectly execute the boot loader 601 in a case that an address of the program called by the MCU is wrong. In actual operation, an upgrading key is introduced to solve the problem, and the update and upgrade of the program is performing while the upgrading key is matching.

In the above grass trimer system, the update and upgrade of the software may be performed on both the battery pack and the lawn mower 210 through the boot loader.

Figure 7:
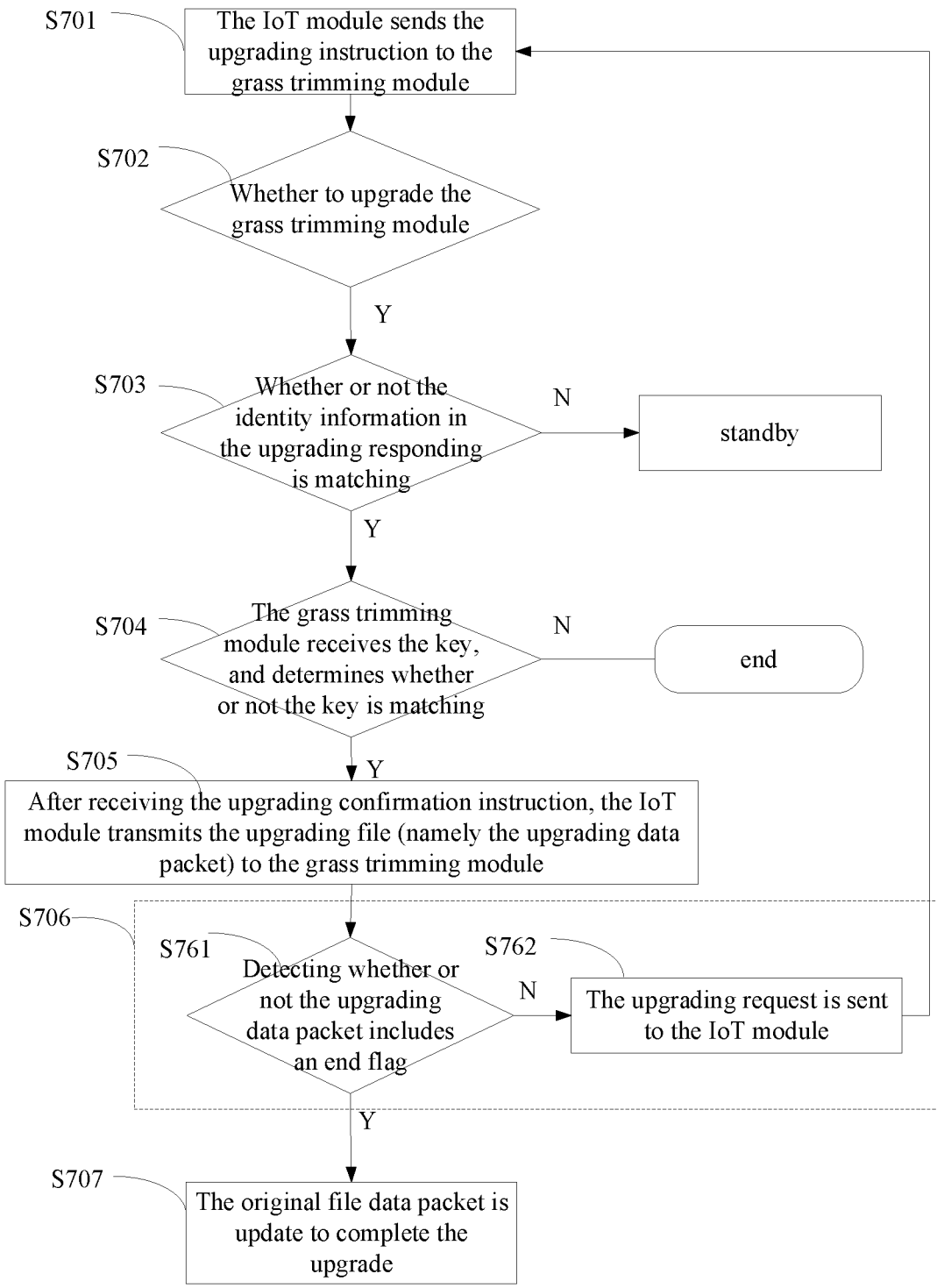
FIG. 7 is a flow diagram illustrating a software upgrading method for a lawn mowing module of the lawn mower according to an example.

Hereinafter, taking the lawn mower as an example, a method for program updating and the software upgrading is performed on the lawn mower through the boot loader is described. Communication connections between respective modules in the lawn mower and the IoT module 160 are established through the bus, and the IoT module may selectively perform the file update and the software upgrade on any one or more of the modules mounted on the bus in a bus scheduling manner. For convenience of description, with reference to FIG. 7, taking the lawn mowing module 140 as an example, the upgrading process of the IoT module 160 calling the lawn mowing module 140 is described.

The method of the lawn mower performing the file update on the lawn mowing module 140 includes the following steps:

S701: the IoT module 160 sends an upgrading instruction to the lawn mowing module 140.

S702: the lawn mowing module 140 receives the upgrading instruction, and determines whether or not the upgrading instruction is for the update of the lawn mowing module 140. If yes, the lawn mowing module 140 sends an upgrading response (including identity information of the lawn mowing module 140) to the IoT module 160; if no, the lawn mowing module 140 enters a standby state.

S703: the IoT module 160 determines whether or not the identity information in the upgrading response is matching; if yes, the IoT module 160 sends a key to the lawn mowing module 140.

S704: the lawn mowing module 140 receives the key, and determines whether or not the key is matched. If yes, the lawn mowing module 140 enters an upgrading state, and the lawn mowing module 140 sends an upgrading confirmation instruction to the IoT module 160; otherwise, end.

S705: after receiving the upgrading confirmation instruction, the IoT module 160 transmits an upgrading file (namely an upgrading data packet) to the lawn mowing module 140.

S706: the lawn mowing module 140 receives the upgrading data packet until the transmission of the upgrading data packet is completed.

An exception may occur during the upgrading process, which causes the upgrading file received by one module to be incomplete, thereby affecting the upgrade of the module. For this reason, an upgrading end flag may be provided to solve the problem. In one example, the upgrading file, namely the upgrading data packet, includes an end flag. In one example, S706 further includes the following sub-steps:

S761: whether or not the upgrading data packet includes an end flag is detected, if no, the lawn mowing module 140 executes S762; if yes, execute S707.

S762: the upgrading request is sent to the IoT module 160, and the IoT module 160 receives the upgrading request and returns to S701 to continue the execution until the upgrade is completed.

In S762, the upgrading request includes a node identity information indicating the lawn mowing module 140, and the IoT module 160 can read the node identity information to call the corresponding upgrading file to be transmitted.

In this way, the success rate of module upgrade is further improved.

S707: the original file data is updated to complete the upgrade.

In S707, taking the lawn mowing module as an example, the lawn mowing storage unit has a boot loader area for storing the boot loader and an application area for storing the application. The lawn mowing control unit is coupled to the lawn mowing storage unit and executes the following operations: receiving the upgrading file, executing the boot loader, and writing the upgrading file into the application area to update the application.

The lawn mowing module 140 is used as an example for description herein. Other modules in the lawn mower, such as self-propelled module 150, the information collection module 130, each may adopt the same method to complete the upgrade. The IoT module 160 may also transmit multiple upgrading data packets to the respective modules through the bus at the same time, so that the respective modules complete the file upgrade thereof.

The modules in the lawn mower cooperatively work with each other. In order to ensure the safe use of the lawn mower, the modules in the lawn mower are configured to execute the following operations: when any one of the modules enters the upgrading state, the other modules enter the standby state.

Figure 8:
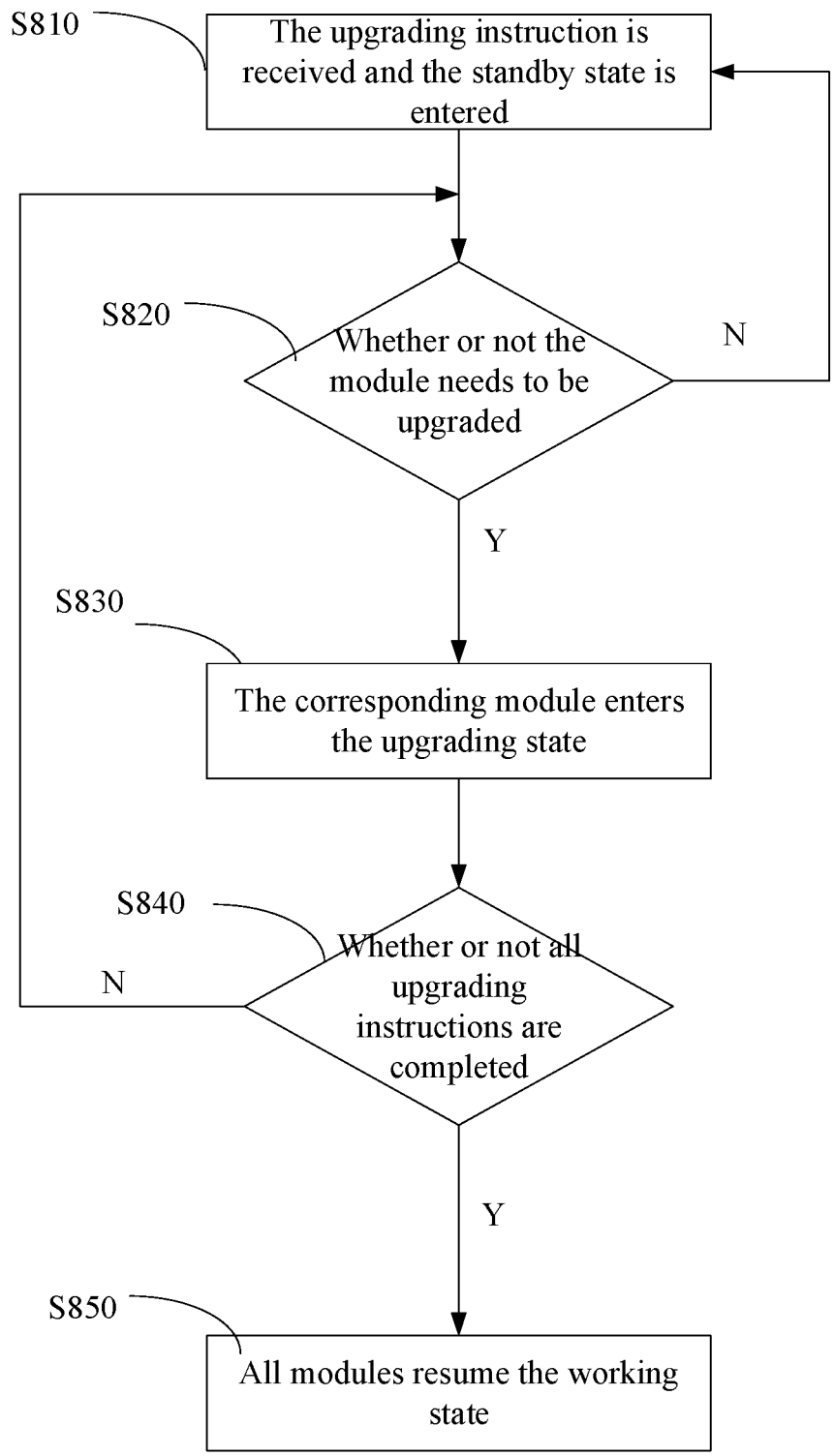
FIG. 8 is a flow diagram illustrating upgrade of modules of the lawn mower according to an example.

In one example, the IoT module 160 transmits the instruction to the respective modules through the bus. With reference to FIG. 8, the modules are configured to execute the following operations:

S810: the modules receive the upgrading instruction, and enter the standby state.

S820: the modules respectively determine whether or not the modules need to be upgraded, if yes, execute S820; otherwise, the modules maintain in the standby state.

S820: the corresponding module enters the upgrading state.

S840: whether or not all the upgrading instruction is completed is determined, if yes, go to S850; otherwise, return to S820.

S850: the modules resume working state.

The IoT module 160 transmits the upgrading instruction to the respective modules through the bus, and the upgrading instruction include an identifier, an upgrading file version number, an upgrading data packet, and a target address of the module to be upgraded and the like.

In some examples, the IoT module 160 includes an IoT processor. The IoT processor is configured to transmit the upgrading instruction to the respective modules in a preset order, so that the modules are upgraded respectively in the preset order.

The battery pack is connected to the lawn mower, the lawn mower is powered on to work, and the battery pack and the lawn mower are in electrical connection and in communication connection. In one example, a communication terminal of the battery pack and a communication terminal of the lawn mower are in communication connection to transmit information. In some example, the lawn mower system may upgrade the battery pack without additionally adding the IoT module 160 to the battery pack.

Figure 9:
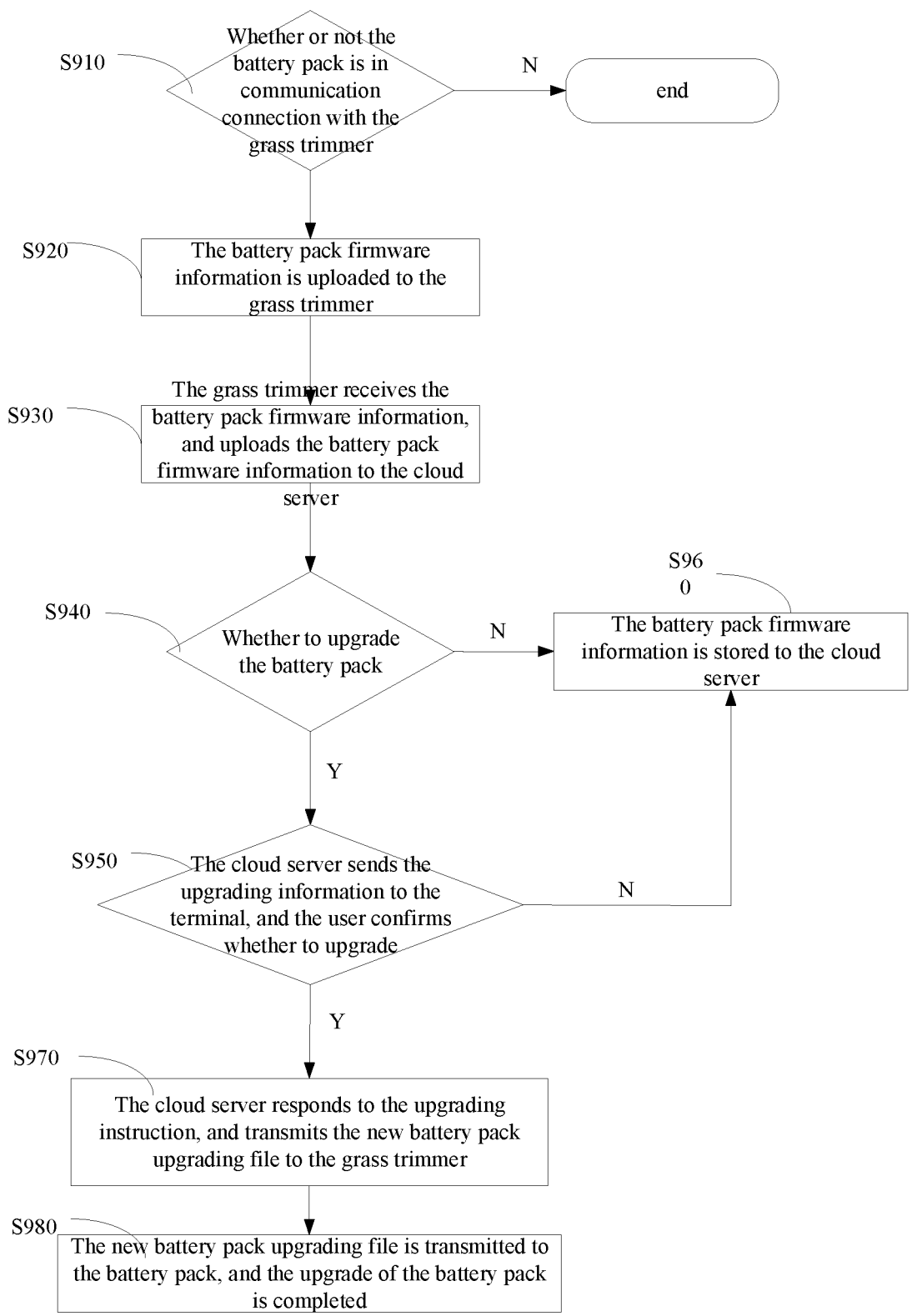
FIG. 9 is a flow diagram illustrating an upgrading method for a battery pack in the lawn mower system according to an example.

With reference to FIG. 9, in another example, the upgrading method for the battery pack in the lawn mower system includes the following steps:

S190: whether or not the battery pack and the lawn mower are in communication connection is determined, if yes, execute S920; otherwise, end.

In this step, the battery pack is coupled to the lawn mower, and the lawn mower determines whether or not the battery pack and the lawn mower are in communication connection. In one example, detecting a change in the electrical signal between the battery pack and the lawn mower is used as a basis for determining whether or not the communication connection is established.

S920: battery pack firmware information is uploaded to the lawn mower.

In this step, the battery pack uploads the battery pack firmware information to the lawn mower through the communication terminal of the battery pack and the communication terminal of the lawn mower. The battery pack firmware information includes a battery pack model, a rated voltage, a historical version model, a battery pack life, and power and the like.

S930: the lawn mower receives the battery pack firmware information, and upload the received battery pack firmware information to the cloud server in a wireless manner through the IoT module 160. In some examples, the battery pack firmware information is uploaded to the IoT module 160 through the bus, and is directly uploaded to the cloud server in a wireless manner through the IoT module 160, so that the battery pack firmware information does not need to be stored in the lawn mower, thereby saving the memory space of the lawn mower.

S940: whether or not the battery pack needs to be updated is determined, if yes, execute S950; otherwise, execute S960.

In this step, the cloud server determines whether or not the battery pack needs to be updated. In one example, if a new battery pack upgrading file is written into the cloud server, the version number of the new battery pack upgrading file and the version number of the uploaded battery pack file are compared, if the two version numbers are the same, the upgrade is not needed; if the two version numbers are not the same, the battery pack needs to be upgraded.

S950: the cloud server sends the upgrading information to the terminal and the user confirms whether to upgrade, if yes, execute step S970; otherwise, execute S960.

In this step, the cloud server sends the upgrading instruction that the upgrade is needed to the terminal in a wireless manner, so that the user may choose whether to upgrade.

S960: the battery pack firmware information is stored to the cloud server.

In this step, the battery pack firmware information is stored to the cloud server so that the user may call the needed information through the terminal, which is convenient for the user to choose and understand the usage status of the battery pack, such as directly displaying the called battery pack information on the terminal.

S970: the cloud server responds to the upgrading confirmation instruction, and transmits the new battery pack upgrading file to the lawn mower.

In this step, the new battery pack upgrading file is transmitted to the lawn mower in a wireless manner, and stored in the IoT module 160.

S980: the new battery pack upgrading file is transmitted to the battery pack, and the upgrade of the battery pack is completed.

Figure 10:
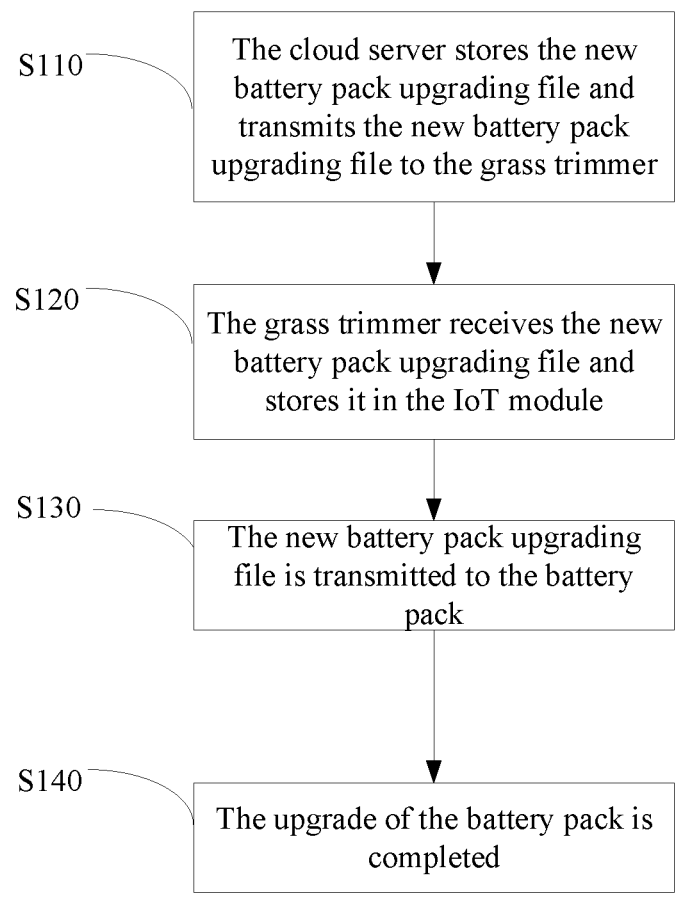
FIG. 10 is a flow diagram illustrating an upgrading method for a battery pack in the lawn mower system according to an example.

With reference to FIG. 10, in another example, the upgrading method for the battery pack in the lawn mower system includes the following steps:

S110: the cloud server stores with the new battery pack upgrading file, and transmits the new battery pack upgrading file to the lawn mower.

S120: the lawn mower receives the new battery pack upgrading file and stores the new battery pack upgrading file into the IoT module 160.

In one example, the new battery pack upgrading file is stored in the file storage unit 162. In this step, in one example, a step of detecting whether or not the battery pack upgrading file is successfully downloaded may be added, for example, the battery pack upgrading file includes an ending flag; if the ending flag is detected, the download is successful; otherwise, the upgrading operation is not executed.

S130: the new battery pack upgrading file is transmitted to the battery pack.

In one example, in this step, the new battery pack upgrading file stored in the IoT module 160 is transmitted to the power supply module 120 through the bus, and then transmitted to the battery pack through the communication terminal of the lawn mower and the communication terminal of the battery pack.

S140: the upgrade of the battery pack is completed.

In this step, the battery pack receives the new battery pack upgrading file, and performs the version upgrade on the original battery pack upgrading file, and finally the upgrade of the batter pack is completed.

The terminal is provided with an interactive interface for the user operation, and the user may remotely control the lawn mower by operating the corresponding display icon. For example, the user operates the terminal to remotely control the on, off, timing on-off, locking of the lawn mower and the like; the user chooses the corresponding operation interface to call the information related to the lawn mower for the user to understand.

The terminal is communicated with the lawn mower in a wireless manner, and may display various information of the lawn mower, such as output power of the lawn mower, total remaining charging time and a self-propelled trajectory.

It should be noted that the above upgrading method is also suitable for other power tool systems including a motor, a driving module for driving the motor and a control module for outputting a control signal.

The cloud server includes a cloud storage unit and a cloud processing unit. The cloud processing unit is configured to receive the data uploaded by the lawn mower and perform data deduplication processing on the data uploaded by the lawn mower. The cloud storage unit is configured to receive and store the battery pack data deduplicated by the cloud processing unit.

FIG. 11 shows a storage structure. The data storage structure includes a packet head for information transmission, a packet body and a packet tail.

The packet body includes start time, data length, data type, data content, electronic serial number, packet serial number and end time. The data is recorded each time from the turn-on of the lawn mower to the turn-off of the lawn mower. The start time is a time corresponding to turning on the lawn mower, and the end time is a time corresponding to turning off the lawn mower.

The data type includes historical data, real-time data, statistical data, control data and the liked. In one example, each data type corresponds to a respective code, for example, a code X001 represents the statistical data, a code X002 represents the historical data, and a code X003 represents the real-time data.

The electronic serial number, namely device ID, is configured for representing the corresponding device. That is to say, each device has a unique electronic serial number to facilitate identification.

The packet tail includes a check bit and the like.

In actual use, the data is recorded each time the lawn mower is turned on, and the condition that the same data is repeatedly written into the storage, which will cause a large amount of redundant data to be stored in the storage to occupy the memory space of the storage. For example, the historical data related to the battery pack is repeatedly written into the cloud storage. Therefore, a simple and efficient method for deduplicating data is needed to release the memory space of the storage and improve the data transmission efficiency.

Figure 12:
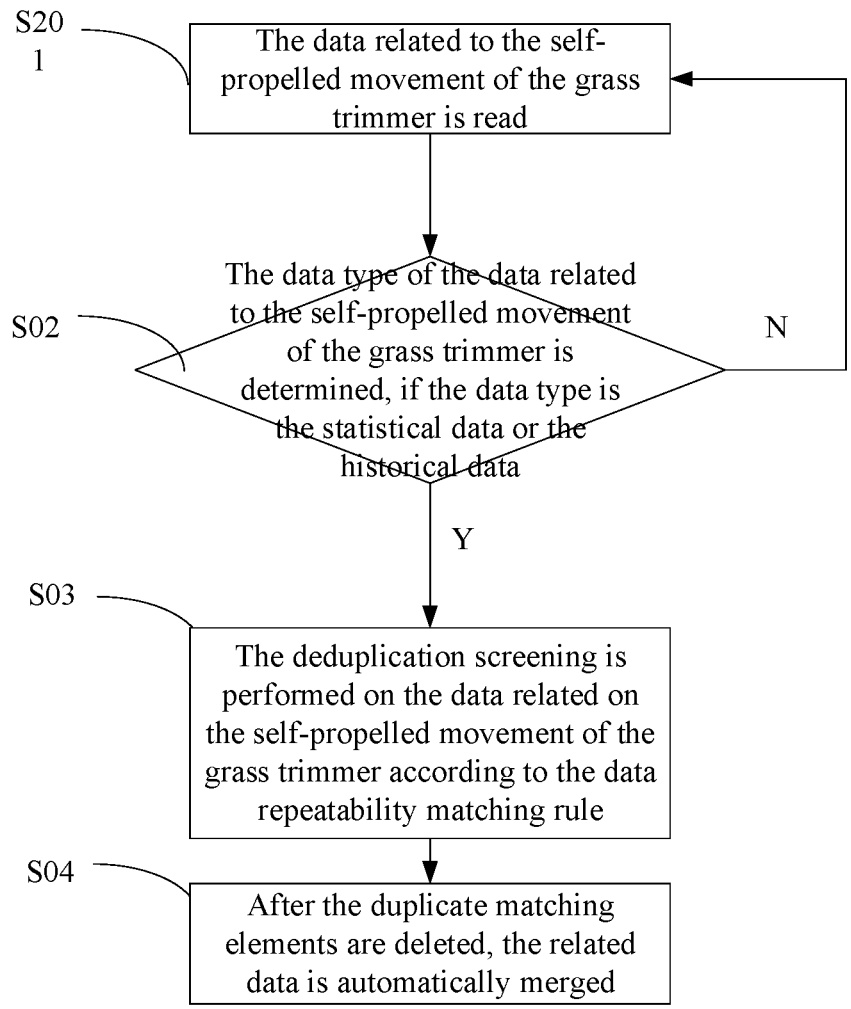
FIG. 12 is a flow diagram illustrating a data processing method of the lawn mower system according to an example.

With reference to FIG. 12, in one example, the cloud processor, the cloud processor adopts the following method to perform data deduplication processing on the data related to the self-propelled movement of the lawn mower.

S201: the data related to the self-propelled movement of the lawn mower is read.

S02: the data type of the data related to the self-propelled movement of the lawn mower is determined, if the data type is the statistical data or the historical data, execute S03; otherwise, execute S201.

S03: the deduplication screening is performed on the data related on the self-propelled movement of the lawn mower according to the data repeatability matching rule.

S04: after the duplicate matching elements are deleted, the related data is automatically merged.

In step S03, the data repeatability matching rule includes multiple matching elements and a matching order of the multiple matching elements. The matching elements include an electronic serial number, a data packet number, a start time and an end time.

In some examples, the matching order is to firstly traverse the electronic serial number and then traverse the data packet serial number. After the data packets having the same electronic serial number and the data packet serial number are deleted, the related data is automatically merged.

In another example, the matching order is to firstly traverse the electronic serial number and then traverse the start time and the end time. After the data packets having the same electronic serial number, the start time and the end time are deleted, the related data is automatically merged.

Figure 13:
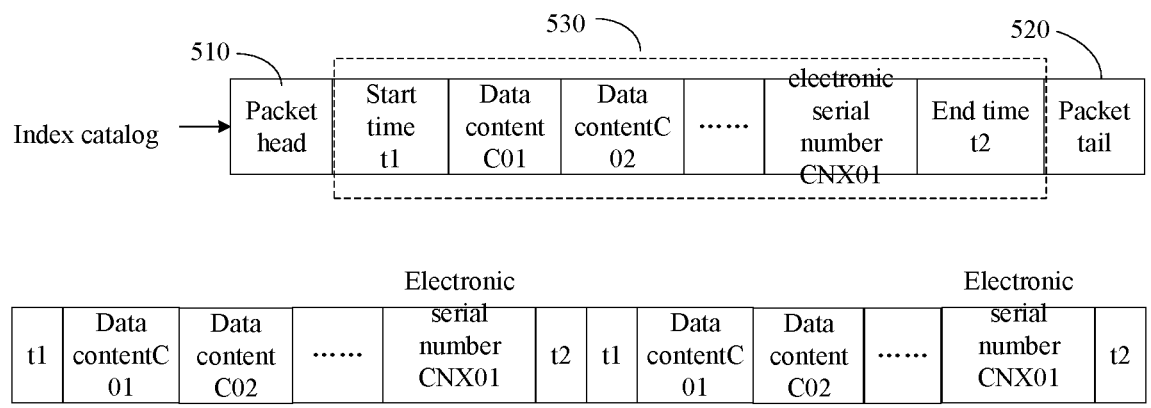
FIG. 13 shows a storage structure of storage data.
Figure 14:
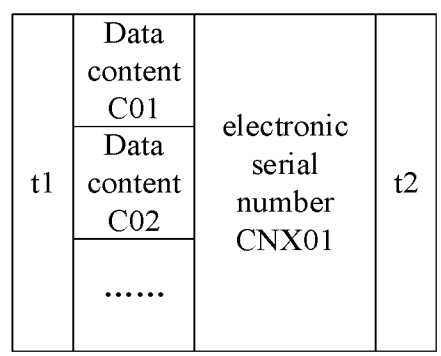
FIG. 14 shows a packet body storage structure of storage data.

As shown in FIG. 13, data in a time period from the start time t1 to the end time t2 is affected by the turn-on and turn off of the lawn mower, and is repeatedly written into the cloud server in a manner shown in FIG. 13. The cloud processor performs the deduplication processing on the data according to the flow shown in FIG. 12. After the duplicate matching elements are deleted, the data is finally written into the cloud storage in a data structure shown in FIG. 14. In this way, the number of bytes is reduced and the memory space in the storage is released.

It can be foreseeable that the deduplication method can be suitable for data stored by other storage units, which is not limited herein.

For example, when the battery pack is mechanically and electrically connected to the battery pack, the data related to and stored in the battery pack is transmitted to the IoT module 160 of the lawn mower through the bus, and then uploaded to the cloud server for storage through the IoT module 160. In this way, the IoT module 160 does not need to be additionally added to the IoT module 160, and the user can call the battery pack data stored in the cloud server through the terminal to quickly obtain the data information of the battery pack.

Figure 15:
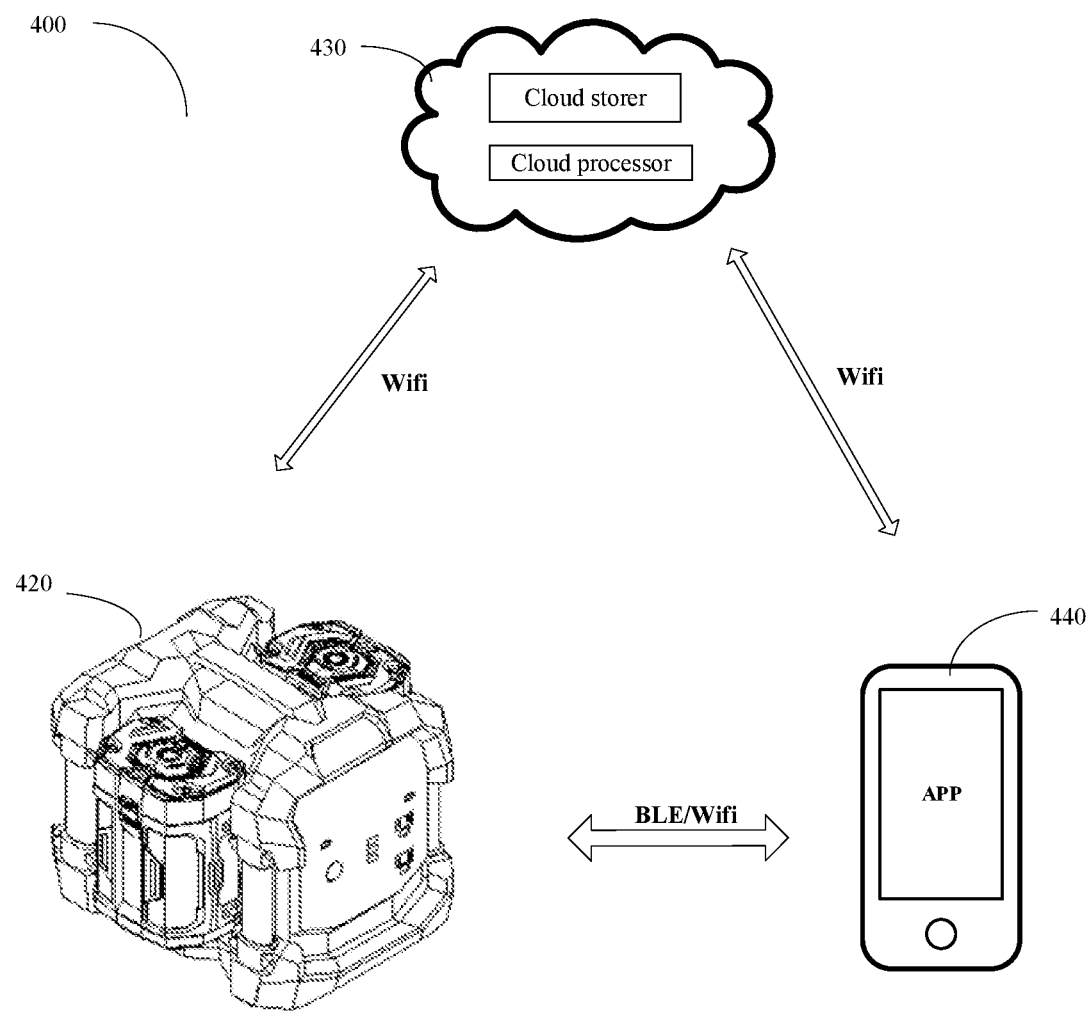
FIG. 15 is a structural diagram illustrating a portable power source system according to an example.
Figure 16:
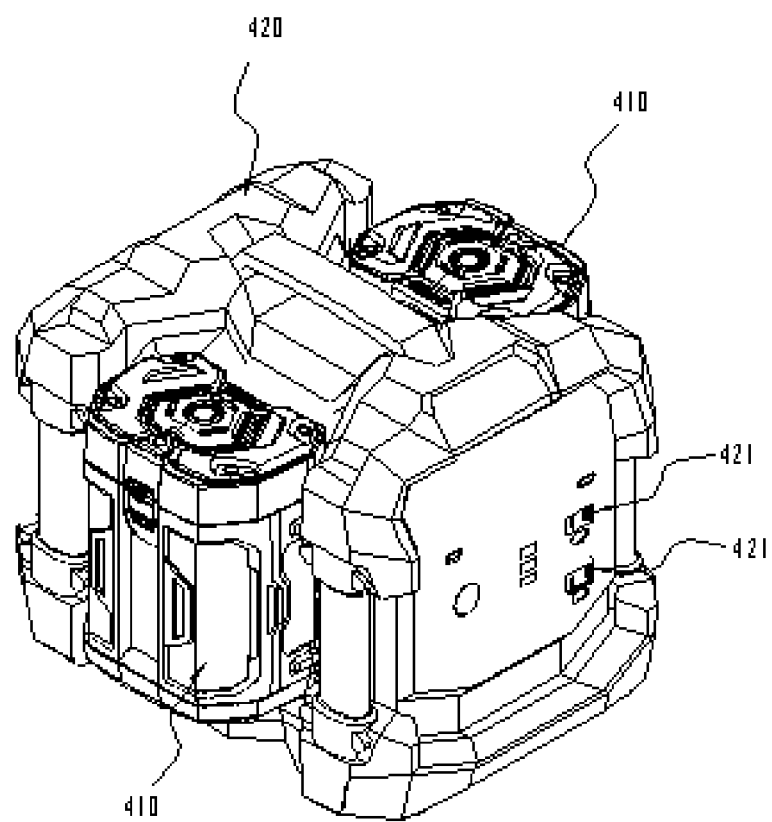
FIG. 16 is a structural diagram illustrating a portable power source in FIG. 15.

With reference to FIG. 15 and FIG. 16, a portable power system 400 includes a battery pack 410, an adapter 420, a cloud server 430 and a terminal 440.

The cloud server 430 has server functions, such as sending and receiving files, receiving and transmitting instructions, computing, data processing and analysis, and network transmission. The cloud server 430 is in wireless communication with the external device through WiFi, ZigBee, NB-IOT and the like. In one example, the cloud server 430 includes a cloud storage and a cloud processor. The wireless communication links are established between the cloud processor 430 and the adapter 420, and between the cloud server 430 and the terminal 440. The above data processing method is also suitable for the cloud server 430, which is not described herein.

The battery pack 10 is selectively connected to the adapter 420 to supply power to the adapter 420. And the battery pack 10 may also be coupled to the power tool to supply power to the power tool.

The adapter 420 may be connected to multiple battery pack and configured for converting the electric energy of the battery packs into an alternating current (AC) to output. The adapter 420 includes an AC output interface 421 and configured for outputting the AC to supply power to the electric equipment. The adapter 420 includes various functional modules, such as an IoT module for wireless connection and transmission, an inverter module for converting the electric energy of the battery packs into the AC, and a battery pack coordinating module for controlling the charge and discharge of the battery packs, and corresponding storage and processor. The above data processing method and upgrading method for the lawn mower system are also suitable for the data storage and deduplication in the adapter 420, which is not described herein.

The above data processing method and upgrading method for the lawn mower system are also suitable for a charger capable of charging the battery pack.

The basic principles, main features and advantages of the present disclosure have been shown and described above. It is to be understood by any person skilled in the art that the foregoing examples are not intended to limit the present disclosure in any form. All technical solutions obtained by equivalent substitution or equivalent transformation are within the scope of the present disclosure.

As will be further appreciated, the present disclosure provides a power tool system and an upgrading method for the power tool system. Through establishing information scheduling between the IoT module and the modules via the bus, the modules simultaneously share an upgrading file transmitted by the IoT module via the bus, the IoT module may simultaneously receive the bus allocation request sent by the modules, which effectively enables the modules to send data in time, avoids delays, and improves the real-time data transmission and the overall transmission efficiency of the system.

What is claimed is:

1. A power tool system, comprising:
   a power tool; and
   a cloud server, which is configured to receive an upgrading file for upgrading the power tool;
   wherein the power tool is adapted for wireless communication with the cloud server and comprises:
      a motor;
      a driving module, which is configured to drive the motor;
      a control module, which is configured to output a control signal to the driving module; and
      an internet of things (IoT) module, which is configured to establish a wireless communication link between the power tool and the cloud server,
   wherein, the IoT module, the driving module and the control module share a bus, and the upgrading file is simultaneously distributed to at least one of the control module or the driving module through the bus, and
   wherein the control module is configured to receive an upgrading instruction and determine whether to upgrade the control module and enable the control module to enter a standby state in response to not upgrading the control module.

2. The power tool system according to claim 1, wherein the IoT module comprises an IoT processing unit, which is configured to respond to an upgrading request and transmit the upgrading instruction to at least one of the driving module or the control module, and a file storage unit, which is configured to store the upgrading file from the cloud server, and transmit the upgrading file to at least one of the driving module or the control module through the bus after receiving the upgrading instruction.

3. The power tool system according to claim 2, wherein the upgrading instruction comprises a preset node upgrading order.

4. The power tool system according to claim 1, wherein the IoT module comprises an IoT verification unit configured to perform security verification on the upgrading file.

5. The power tool system according to claim 1, wherein the control module comprises a storage, which comprises a boot loader area for storing a boot loader and an application area for storing an application, and a processor, which is coupled to the control storage and configured to receive the upgrading file, execute the boot loader; and write the upgrading file into the application area to update the application.

6. The power tool system according to claim 5, wherein the storage is a flash memory and is configured to, when the boot loader is executed, firstly erase the application stored in the application area.

7. The power tool system according to claim 1, wherein the power tool comprises a lawn mower.

8. An upgrading method for a power tool system, wherein the power tool system comprises a cloud server and a power tool in wireless communication with the cloud server, the power tool comprises a driving module for driving a motor, a control module for outputting a control signal to the driving module and an IoT module for establishing a wireless communication link with the cloud server, and the upgrading method comprises:

writing an upgrading file into the cloud server;

simultaneously transmitting the upgrading file to at least one of the control module or the driving module through a bus; and determining whether to upgrade the control module and enabling the control module to enter a standby state in response to not upgrading the control module.

9. The upgrading method according to claim 8, wherein the IoT module stores the upgrading file from the cloud server, responds to an upgrading request, and transmits an upgrading instruction to at least one of the driving module or the control module.

10. The upgrading method according to claim 9, wherein the upgrading instruction comprises a preset node upgrading order.

* * * * *